J. C. BARRETT.
WEIGHING SCALE.
APPLICATION FILED NOV. 13, 1915.
1,285,591.
Patented Nov. 26, 1918.
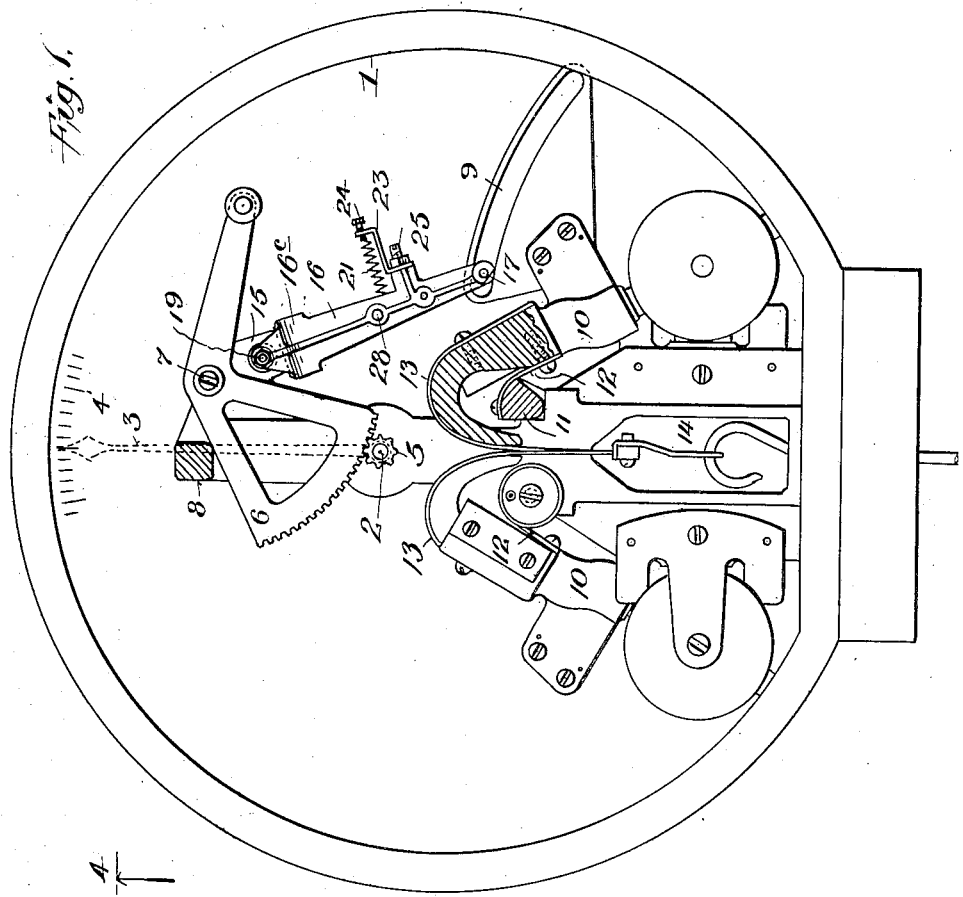
Inventor
Joseph C. Barrett
By his Attorney
P. F. Bourne

UNITED STATES PATENT OFFICE.

JOSEPH C. BARRETT, OF BROOKLYN, NEW YORK, ASSIGNOR TO AMERICAN KRON SCALE COMPANY, OF NEW YORK, N. Y., A CORPORATION OF NEW YORK.

WEIGHING-SCALE.

1,285,591.  Specification of Letters Patent.  Patented Nov. 26, 1918.

Application filed November 13, 1915. Serial No. 61,203.

*To all whom it may concern:*

Be it known that I, JOSEPH C. BARRETT, a citizen of the United States, and resident of New York city, borough of Brooklyn, in the county of Kings and State of New York, have invented certain new and useful Improvements in Weighing-Scales, of which the following is a specification.

In weighing scales having indicators, such as pointers, and particularly such scales having weighted arms supported from fulcrum blocks and operated from a platform, scale-pan or the like, for causing operation of the indicator, the indicators are liable to vibrate by reason of shocks or jars in buildings, due largely to the delicately poised mechanism of the scale. The object of my invention is to provide simple and efficient means to prevent the indicator or pointer from vibrating when subjected to ordinary shocks, jars or vibration of buildings and other places where the scale is used.

My invention comprises novel details of improvement and combinations of parts that will be more fully hereinafter set forth and then pointed out in the claims.

Reference is to be had to the accompanying drawings forming part hereof, wherein, Figure 1 is a partly sectional view of a scale mechanism embodying my invention;

Fig. 2 is an edge view of part of Fig. 1, illustrating my improvements;

Fig. 3 is a side view of Fig. 2;

Fig. 4 is a section substantially on the line 4, 4, in Fig. 2, and

Fig. 5 is a cross section on the line 5, 5, in Fig. 2.

Similar numerals of reference indicate corresponding parts in the several views.

In the drawings the numeral 1 indicates a casing or frame of a suitable weighing scale, in which is pivotally supported a shaft 2 carrying or operating in any suitable manner an indicator or pointer 3, adapted to sweep in front of a suitable scale or dial 4, all of which parts may be of any wellknown construction. As illustrated in the accompanying drawings a pinion 5 is secured upon shaft 2, and in mesh with rack 6 shown pivotally supported at 7 upon a standard or upright 8 within the casing. At 9 is a pointer actuator shown in the form of a cam, shown connected with a weighted arm 10, hung from a fulcrum block 11 by means of a flexible strip 12. A flexible strip 13 is shown connected with said arm and with a suitable pulling device 14 to be connected with a scale platform, scale-pan or the like, whereby when said arm is operated by a weight upon the platform or pan, cam 9 will be moved to actuate the indicator 3. I have illustrated two weighted arms 10 and corresponding fulcrum blocks and flexible strips, all of which parts may be of any suitable construction. The actuator or cam 9 is adapted to operate rack 6, and in ordinary weighing scales of this class, as known to me, the connection between cam 9 and rack 6 has been made rigid, so that said rack partakes of all the motions and vibrations of and communicated to it by such actuator. In accordance with my present invention I provide connecting means between actuator or cam 9 and rack 6 adapted to cause operation of said rack by said cam, and yet to prevent the communication to the indicator or pointer 3 of vibrations of cam 9 caused by shocks, jars and the like in buildings or places where the scale is used. I have shown an arm 15 connected with rack 6, which arm is movably connected with and carries a member 16 that is adapted to coact with actuator or cam 9. Member 16 is shown provided with an anti-friction roll 17 to operate in the cam slot of actuator 9 in a wellknown manner. Member 16 is pivotally connected with arm 15 and is also operatively yet resiliently or flexibly connected with said arm at a point distant from such pivot. I have shown arm 15 provided with a double-pointed arbor or stud 18, receiving screws 19 carried by the forked end 16ª of member 16, locking nuts 20 serving to hold said screws in set positions. By the means described, arm 15 and member 16 may be pivotally connected in a delicate manner to avoid friction. At 21 is a spring shown coactive between arm 15 and member 16, for which purpose said spring is shown connected at one end, as at 22, with arm 15 and at its opposite end with a bracket 23 carried by member 16. For the purpose of regulating the tension of spring 21 between arm 15 and member 16, I have shown a screw 24 threaded in an aperture in bracket 16 and connected with spring 21. Spring 21 normally retains arm 15 and member 16 in coactive relation, and in order to permit adjustment of said arm and member with relation one to another, I have shown said arm provided with an adjusting screw 25, coacting with a stop 26, carried by arm 15, a nut 27 on screw 25 serving to retain the latter in set position. The stop 26 may be made of a piece of hardened steel, and the adjacent end of screw 25 may also be hardened. At 28 is a pin shown carried by member 16 and extending through a slot 29 in arm 15, (Fig. 4), whereby said arm and member are kept from undue relative displacement. I have shown member 16 as having spaced arms connected by bridge pieces 16$^b$, and 16$^c$, whereby said arms of said member are retained spaced to receive the arm 15 freely therebetween. Arm 15 is also shown comprising spaced members 15$^a$, 15$^b$, retained together by the interposed block 30, through which screw 18 passes, nuts 31 on said screw serving to clamp the parts 15$^a$, 15$^b$ and 30 firmly together, and a rivet 32 passing through said arms 15$^a$, 15$^b$ and through the hardened piece 26 secures said arms together at their free ends. The particular construction of arm 15 and of member 16 above described may be varied if desired.

In accordance with my improvements, when the actuator or cam 9 moves under the influence of a weight, it will move the member 16, and thereupon spring 21 will be slightly stretched and pin 28 will be moved through slot 29 until said pin engages an end of the slot, whereupon arm 15 will be moved to in turn operate the indicator or pointer 3, through the interposed gearing, to indicate the weight, and when the weight on the platform or scale pan has settled the spring 21 will act to draw arm 15 and member 16 into normal relation as by causing the stop 26 to again bear against screw 25, whereupon the final position of the pointer will be set. If actuator or cam 9 be vibrated or jarred, as by reason of vibration or jarring in the building containing or adjacent to the scale, such vibration will not be communicated to indicator or pointer 3 because of the flexible or resilient connection at 21 between member 16 and arm 15. Such connection serves to absorb the vibrations that would be communicated from actuator or cam 9 to the indicator or pointer were such parts operatively connected by a rigid arm, as has customarily been the case in the class of scales set forth, so far as I am aware. A further advantage of my improvements is that adjustment can be made by means of screw 25 between member 16 and arm 15, whereby the relation of the indicator or pointer to the zero point of the dial with respect to the normal position of actuator or cam 9 may be adjusted within limits, the spring 21 maintaining arm 15 and member 16 in flexible relation.

While I have illustrated and described a particular embodiment of my invention in connection with a weighing scale of the class set forth, it will be understood that my invention is not limited in its use to such class of weighing scales, nor to the particular details of construction and arrangements of parts set forth, as the same may be varied, within the scope of the appended claims, without departing from the spirit of my invention.

Having now described my invention what I claim is:—

1. A weighing scale having an indicator, an actuator therefor, operating means interposed between said indicator and actuator comprising an arm, a member pivotally connected at one part with and carried by said arm and adapted to coact at another part with said actuator, and resilient means interposed between said arm and member to permit free movement of the latter relatively to said arm to prevent vibrations transmitted to said actuator from being transmitted through said arm to vibrate the indicator.

2. A weighing scale having an indicator, an actuator therefor, operating means interposed between said indicator and actuator comprising an arm, a member movably connected with and supported by said arm and adapted to coact with said actuator, a stop between said arm and member to limit their relative movement in one direction, and a spring between said arm and member normally holding the latter with relation to said stop permitting relative movement of said arm and member in another direction.

3. A weighing scale having an indicator, an actuator therefor, operating means interposed between said indicator and actuator comprising an arm, a member movably connected with said arm and adapted to coact with said actuator, a screw carried by one of said parts, a stop carried by the other part coacting with said screw, and a spring connecting said parts normally retaining said stop and screw in coaction.

4. A weighing scale having an indicator, an actuator therefor, operating means interposed between said indicator and actuator comprising an arm, a member pivotally connected and supported by said arm and coactive with said actuator, means to limit relative movement between said arm and member in one direction, and a spring connecting said arm and member to hold them normally with relation to said limiting means and permit their relative movement in another direction.

5. A weighing scale having an indicator, an actuator therefor, operating means interposed between said indicator and actuator comprising an arm, a member pivotally connected with said arm and coactive with said actuator, means to limit relative movement between said arm and member, a spring connecting said arm and member to hold them normally with relation to said limiting means, and means to adjust the tension of said spring.

6. A weighing scale having an indicator, an actuator therefor, operating means interposed between said indicator and actuator comprising an arm, a member movably connected with said arm and adapted to coact with said actuator, a stop between said arm and member, a spring between said arm and member normally holding the latter with relation to said stop, and means between said arm and member to cause the latter to positively move the former and permit limited relative movement between said parts.

7. A weighing scale having an indicator, an actuator therefor, operating means interposed between said indicator and actuator comprising an arm, a member movably connected with said arm and adapted to coact with said actuator, a stop between said arm and member, a spring between said arm and member normally holding the latter with relation to said stop, and a pin and slot connection between said arm and member to permit limited relative movement thereof relatively one to another.

8. A weighing scale having an indicator, an actuator for the latter, and a member interposed between the indicator and actuator comprising a plurality of parts movably united together and having resilient means tending to move them relatively and an opposing stop to normally retain them in operative relation against the tension of said resilient means and to permit one to be moved relatively to the other through said resilient means, the latter causing them to be restored to normal.

Signed at New York city, in the county of New York, and State of New York, this 12th day of November A. D. 1915.

JOSEPH C. BARRETT.

Witness:
T. F. BOURNE.